March 3, 1959 C. P. VILLARS 2,876,418

ENCODER FOR PULSE CODE MODULATION

Filed May 9, 1957 3 Sheets-Sheet 1

INVENTOR
C. P. VILLARS
BY W. L. Keefauver
ATTORNEY

March 3, 1959 C. P. VILLARS 2,876,418

ENCODER FOR PULSE CODE MODULATION

Filed May 9, 1957 3 Sheets-Sheet 2

INVENTOR
C. P. VILLARS
BY W. L. Keefauver
ATTORNEY

March 3, 1959 C. P. VILLARS 2,876,418
ENCODER FOR PULSE CODE MODULATION
Filed May 9, 1957 3 Sheets-Sheet 3

INVENTOR
C. P. VILLARS
BY W. L. Keefauver
ATTORNEY

United States Patent Office 2,876,418

Patented Mar. 3, 1959

2,876,418

ENCODER FOR PULSE CODE MODULATION

Claude P. Villars, Summit, N. J., assignor to Bell Telephone Laboratories, Incorporated, New York, N. Y., a corporation of New York Application May 9, 1957, Serial No. 658,205

15 Claims. (Cl. 332—1)

This invention relates to encoders for pulse code modulation communication systems and, more particularly, to sequential digit recognition encoders.

In communication systems utilizing pulse code modulation (PCM), the instantaneous amplitude of a signal wave to be transmitted such as, for example, a speech or other message wave, is recurrently sampled. The resulting amplitude samples, comprising a series of pulses modulated in amplitude according to the signal wave and hence pulse amplitude modulated (PAM), are represented by permutation code groups of pulses of a fixed number of code elements or digits in accordance with a particular code. The device used to translate PAM samples into permutation code groups is called a PCM encoder. Binary codes are particularly advantageous since each code element or digit may have but one of two values. A satisfactory way to represent two such values for transmission purposes is to represent one value by the presence of a pulse in an assigned pulse position, i. e., an "on" pulse, and the other value by the absence of a pulse in the assigned pulse position, i. e., an "off" pulse. Furthermore, it is convenient to use "on" pulses to represent the digit "1" and "off" pulses to represent the digit "0" of the binary code.

Encoders for PCM communication systems have fallen into one of three general groups which may be termed the counting type, the simultaneous or "flash" recognition type, and the sequential recognition type. A typical counting type of encoder uses computer techniques to count, in a binary scale, the number of units in each PAM sample. The permutation code group representing this sample is then "read out" of the counting circuit and transmitted. An example of this type of encoder is shown in A. H. Reeves Patent 2,272,070, issued February 3, 1942.

A simultaneous or "flash" type of encoder measures the amplitude of the PAM sample against a set of scaled values representing all of the possible code permutations and from this measurement generates all of the digits of each code group simultaneously. A simultaneous encoder, using a cathode ray scanning tube and a code indexed target is disclosed in R. L. Carbrey Patent 2,602,158, issued July 1, 1952.

The third type of encoder makes a series of comparisons between the PAM sample and a set of reference values and derives one digit of the permutation code group for each comparison, beginning with the most significant digit. One example of this type of encoder is disclosed in P. F. M. Gloess et al. Patent 2,569,927, issued October 2, 1951. The present invention is also concerned with the sequential digit recognition type of encoder.

In previously known types of sequential digit recognition encoders, the PAM sample is operated upon between comparisons, usually by changing its value by a factor of two. In the above-mentioned Gloess et al. Patent 2,569,927, for example, the PAM sample is compared to a reference voltage which is subtracted therefrom if it is larger, the remainder being multiplied by two and fed back into the comparison circuit. This "feedback subtraction" process is continued until the entire code group is formed, whereupon the next PAM sample is introduced. It will be noted that each PAM sample must be completely encoded before the next sample can be introduced into the encoder. The PAM samples must therefore be separated by at least that period of time required to completely encode one sample. For some purposes, such as encoding television or multiplexed telephone signals, samples must be taken at a rate faster than they can be separately encoded in order to represent the signal accurately. Furthermore, the operations which are performed upon the PAM samples are difficult to perform accurately and it is even more difficult to retain this accuracy throughout the life of the encoder. Active circuit elements tend to shift their operating characteristics with time and thus can affect the accuracy of the encoding process, particularly the value of the least significant digit.

It is therefore an object of the present invention to increase the speed of encoding amplitude modulated pulse samples in a binary code by the sequential digit recognition method to a rate many times the rate required for complete encoding of one sample prior to the introduction of the succeeding sample.

It is another object of the invention to increase the accuracy of encoding amplitude modulated pulse samples as well as the speed.

It is a more specific object of the invention to encode amplitude modulated pulse samples by the sequential digit recognition method without operating on the pulse sample or upon a common reference signal.

In accordance with the present invention, the instantaneous amplitude of a signal wave to be transmitted, or of a plurality of such waves, is recurrently sampled at a rate sufficiently high to afford an accurate representation of the signal variations. Each sample pulse thus obtained is distributed in a predetermined time sequence to $n$ digit comparison circuits, where $n$ is the number of digits in the code, beginning with the most significant digit and proceeding to the least significant digit. In the first comparison circuit, the pulse sample is compared to a reference signal and a code pulse is generated if this sample is equal to or exceeds the reference signal. The presence or absence of this pulse represents the value of the first digit of the code representing the particular sample. In the second comparison circuit, the reference signal is generated by means of an accurate, passive partial decoder into which the results of the first comparison are fed. One such decoder is shown in an article by B. D. Smith entitled "Coding by feedback methods," appearing in the Proceedings of the Institute of Radio Engineers, pages 1053 through 1058, August 1953. Similarly, the reference signal for the third comparison circuit is generated by a second partial decoder into which is fed the results of the previous two comparisons, and so forth. Thus the reference signal for each digit comparison is generated by decoding all previously encoded digits. No subtraction or multiplication operations on the signal sample need be performed and hence a higher degree of accuracy than that of the feedback subtraction type of sequential digit recognition encoding is inherent in the system. Furthermore, each digit comparison circuit is active only for the period of time required to encode one digit of the code group. These comparison circuits can therefore be operated simultaneously, each one operating on a different pulse sample, and the amplitude modulated pulse samples need be separated only by the period required to encode one digit rather than the period required to encode an entire code group. This results in a coding speed $n$ times as fast as the ordinary feedback subtraction type encoder.

The major advantages of the present invention are the extremely high speed and accuracy with which pulse samples can be encoded as compared to other forms of sequential digit recognition encoders.

Another advantage of the invention resides in the use of passive elements which are less subject to failure for the critical portions of the sequential digit recognition encoder.

These and other objects and features, the nature of the present invention and its various advantages, will appear more fully upon consideration of the specific illustrative embodiments of the invention shown in the accompanying drawings and described in the following detailed explanation of these drawings.

Figure 1:
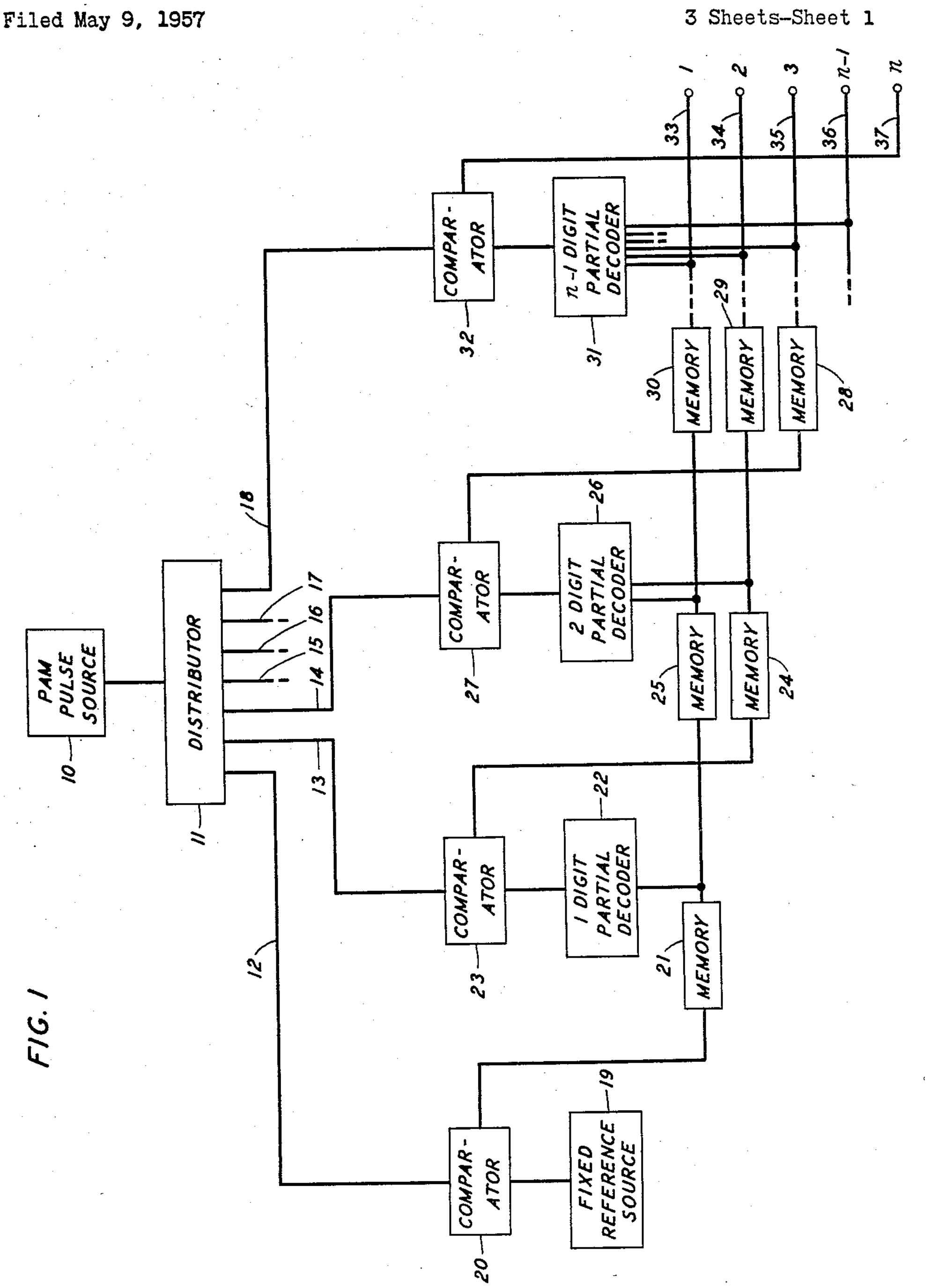
Fig. 1 is a block diagram of a sequentail digit recognition encoder in accordance with the principles of the invention.

In Fig. 1 there is shown a block diagram of an encoding system for the conventional binary code embodying the principles of the present invention. An input signal or message wave of "pulse amplitude modulated" (PAM) pulses is derived from a source 10. These PAM samples may be derived from a conventional signal wave by, for example, gating the signal wave to produce a series of pulses whose amplitudes vary in accordance with the amplitude of the signal wave. This train of PAM pulses is applied to a distributor 11. The purpose of distributor 11 is to apply each PAM sample to output lines 12 through 18 in a sequential fashion. That is, distributor 11 applies a first PAM sample to output line 12; then, after a predetermined time interval, to output line 13; then to output line 14; and so forth. Distributor 11 may, for example, comprise a tapped delay line having a negligible loss between adjacent taps. Distributor 11, however, may also comprise a clocked switching circuit, a distributed amplifier, or any other of the many conventional commutating means.

Output line 12 is connected to a comparator circuit 20 and then to a fixed reference source 19. Fixed reference source 19 merely generates a reference voltage of fixed magnitude with which the PAM sample delivered by line 12 is compared. This magnitude is equal to one-half the maximum amplitude to be encoded. Comparator circuit 20 generates an output pulse if, and only if, the PAM sample delivered by line 12 is equal to or greater than the fixed reference signal generated by source 19. The pulse output of comparator circuit 20, if any, is stored in memory 21 for the interval between the time the PAM sample is delivered to line 12 and the time the same pulse is delivered to line 13. This period may be made as small as is practical with the components used in the circuit.

This same PAM sample is now delivered to output line 13. Instead of being compared to a fixed reference signal, however, the sample is compared to a signal generated by partial decoder 22. The function of partial decoder 22 is, in general, to decode the digit pulse produced by comparator 20. It can be seen that in the presence of a pulse from comparator 20 partial decoder 22 must generate a signal having a magnitude corresponding to the sum of the first two digits of the binary code into which the sample is being translated, in this case the conventional binary code. In the absence of a pulse from comparator 20, however, partial decoder 22 must generate a signal having a magnitude corresponding only to the second digit of the binary code. Decoder 22 may therefore be properly termed a one-digit partial decoder.

Comparator circuit 23, similar to comparison circuit 20, generates a pulse output when the PAM sample delivered by line 13 is equal to or exceeds the reference signal provided by partial decoder 22. This pulse output is stored in a memory circuit 24 which is in all respects identical to memory 21. Similarly, the pulse delivered by memory 21 to partial decoder 22 is also delivered to another memory circuit 25.

The PAM sample is now delivered by line 14 to a second partial decoder 26 which performs the same function as partial decoder 22 except that there are now two binary digits to be decoded. Comparator circuit 27 generates a pulse output when the PAM sample is equal to or exceeds the output of partial decoder 26. This output pulse is stored in a memory 28 as is the output of memory 24 stored in memory 29 and the output of memory 25 stored in memory 30.

It can be seen that comparator circuits 20, 23 and 27 have generated the first three digits of an $n$ digit binary code, beginning with the most significant digit. The number of digits of the binary code used may be equal to any number desired. A common number of digits used for coding of speech waves is 7, and in this case 128 permutations of the code are possible, thus permitting 128 different levels of magnitude to be represented by the code.

In Fig. 1 provision is shown for only four digits, the last digit being represented by $n$. Thus, the pulses representing all previously coded digits are delivered to an $n-1$ digit partial decoder 31 which decodes these previous digits to provide a reference signal having a magnitude corresponding to the analog equivalent of the digits represented by the previously encoded pulse signals. The same PAM sample, delivered by line 18 is compared to this reference signal by another comparison circuit 32 which generates a pulse output if the PAM sample is equal to or exceeds the reference signal. The pulse output of comparison circuit 32 represents the last or least significant digit of the code group representing this particular PAM sample. The individual digit pulses are delivered by lines 33 through 37 in parallel to a utilization circuit such as, for example, a transmission system. If it is desired to have the digit pulse output in series rather than in parallel, each of the outputs on lines 33 through 37 may be delayed a different amount to produce the proper sequence in the series.

It can be seen that the encoder shown in Fig. 1 separately encodes each digit using the value of all previously encoded digits to generate a reference signal for its particular digit comparison. Furthermore, the circuitry by which each digit is encoded is utilized only for that period of time required to encode that particular digit. Hence each digit comparison circuit is available for further operations while the subsequent digits are being generated. Thus, as soon as comparator circuit 20 has generated the first digit of the code group and passed it on to memory 21, it may immediately be used for generating the first and most significant digit for the next PAM sample. Similarly, all the remainder of the digit encoders may simultaneously be used to generate one digit from $n$ different PAM samples. This simultaneous action increases the speed of this type of sequential digit recognition encoders by a factor $n$. Furthermore, no operations need be performed upon the PAM samples, thus increasing both the accuracy and the component reliability of the encoder.

Figure 2:
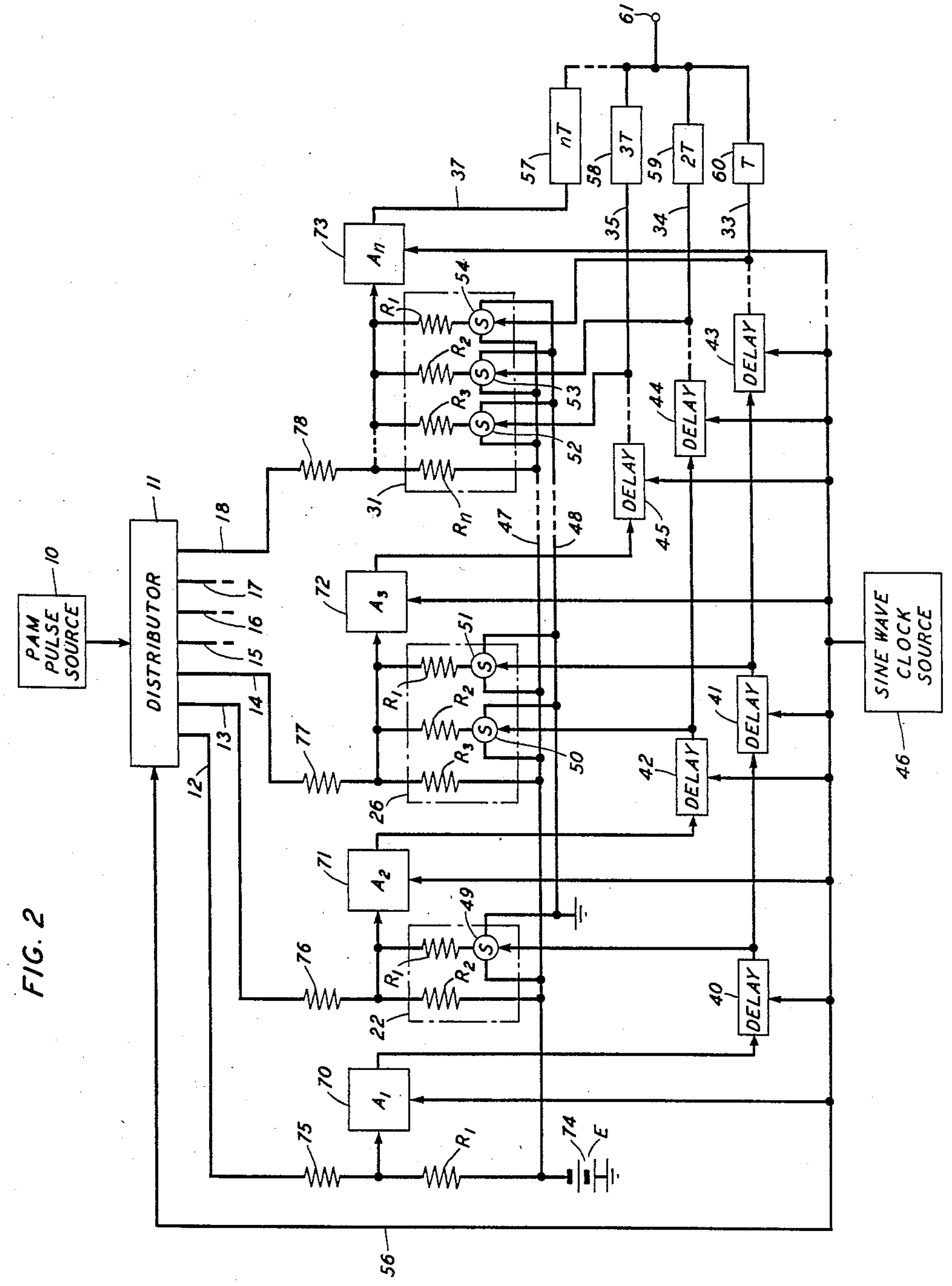
Fig. 2 is a schematic representation of a preferred illustrative embodiment of the encoder of the invention.

In Fig. 2 there is shown a preferred illustrative embodiment of the encoder schematically represented in Fig. 1. All components in Fig. 2 which are identical to those shown in Fig. 1 have been represented by like numbers. Thus, PAM samples are delivered by a source 10 to a distributor 11 which delivers each of the PAM samples to output lines 12 through 18 in a sequential fashion. These pulses are, for example, of positive polarity and variable amplitude. In this embodiment, however, the fixed reference for the first and most significant digit, represented by a constant current, is delivered by a source 74 of direct current potential through a resistor R1. A pulse generating circuit 70, represented by "$A_1$" and to be more fully described below, produces an output if the current delivered by the PAM sample through a resistor 75 is equal to or exceeds this fixed reference current. The output of pulse generating circuit 70 is delivered to a delay circuit 40 which performs the function of memory 21 in Fig. 1 and which will be more fully explained below.

The PAM sample is now delivered by line 13 and a resistor 76 to a second pulse generating circuit 71, represented by "$A_2$," and a partial decoder 22. Partial decoder 22 comprises a first resistor R1, a second resistor R2 and a switch 49. The function of switch 49 is to connect resistor R1 to ground bus 48 or to constant potential bus 47, depending upon whether or not an output is produced from delay circuit 40. Similarly, partial decoder 26, used to generate a reference signal for the third most significant digit comparison, comprises three resistors R1, R2 and R3. Connected to R1 is a switch 51 which is operated by the output of delay circuit 42 and which connects resistor R1 to bus 47 or to bus 48. Similarly, a switch 50 is connected to resistor R2; is operated by the output of delay 41; and connects resistor R2 alternatively to bus 47 or to bus 48. The operation of these partial decoding circuits will be more fully explained below.

It can be seen that partial decoder 31, connected to output line 18, also comprises a series of resistors R1, R2, R3, . . . R*n*, all of which, except R*n*, are connected to respective ones of switches 52, 53, 54, etc. Each of these switches performs the same function as switches 49 through 51 and is operated by the outputs of delay circuits 43, 44, and 45, respectively. The operation of these partial decoding circuits will now be explained.

The function of the partial decoding circuits of Fig. 2 is to generate a reference current equal to the magnitude of that portion of the PAM sample which all previously coded digits are intended to represent. Thus the reference current delivered by potential source 74 through resistor R1 to pulse generating circuit 70 is of a magnitude equal to one-half of the maximum signal magnitude which can be encoded in this encoder, or $\frac{1}{2}\ 2^n$ units. The output of circuit 70 therefore indicates whether the particular PAM sample is greater than or less than $\frac{1}{2}\ 2^n$ units. Similarly, potential source 74 delivers another reference current through resistor R2 to comparison circuit 71. This reference current has a magnitude corresponding to the second digit of a binary code or $\frac{1}{4}\ 2^n$ and hence is one-half the magnitude of the reference current delivered to the pulse generating circuit 70. If, however, pulse generating circuit 70 produces an output, this output is delivered by way of delay circuit 40 to switch 49. Switch 49 normally connects resistor R1 in circuit 22 to ground. In the absence of a pulse from circuit 70, the total reference current delivered to pulse generating circuit 71 is therefore $\frac{1}{4}\ 2^n$ units. However, in the presence of a pulse from circuit 70 the total reference current is $$\frac{1}{4}\ 2^n+\frac{1}{2}\ 2^n=\frac{3}{4}\ 2^n \text{ units}$$

The output of pulse generating circuit 71 indicates whether the PAM sample is greater than or less than this generated reference current. This output is fed through delay circuit 42 to partial decoder 26 and adds in that portion of the reference current corresponding to the second most significant digit by means of resistor R2 and switch 50. R3, similarly to R2 in partial decoder 22 adds in the value of the third most significant digit. All the remainder of the partial decoding circuits operate in precisely the same fashion. Each time a digit is added to the code group a resistor and switch are added to the partial decoding circuit to decode the added digit. This type of decoder, called the shunt resistor decoding network, is shown and described in an article by B. D. Smith entitled "Coding by feedback methods," Proceedings of the Institute of Radio Engineers, pages 1053 through 1058, August 1953.

The last and least significant digit is coded in pulse generating circuit 73, represented by "$A_n$," using a reference current generated by partial decoding circuit 31. The values of the resistors in each of the decoding networks including decoding circuit 31, are related by the following formula:

$$R1=\frac{1}{2}R2=\frac{1}{4}R3\ .\ .\ .=\frac{1}{2^{n-1}}Rn$$

By using this formula, a partial decoder for any number of digits may be constructed.

Returning to Fig. 2, there is shown a sine wave clock source 46 which delivers timing pulses to delay circuits 40 through 45, to pulse generating circuits 70, 71, 72 and 73, and, by way of line 56, to distributor 11. In a preferred embodiment, distributor 11 comprises a commutating circuit utilizing a stepping chain operated by the clock pulses and fed into logical And gates, along with the PAM sample. The purpose of the clocking signals derived from source 46 is to insure that each digit comparison takes place at the proper time slot and that all of the comparison circuits operate in synchronism.

Output lines 33, 34, 35 and 37 from the individual digit comparison circuits are connected to delay lines 57 through 60, respectively. The purpose of these delay lines is to convert the parallel output of the encoder to a serial output at output terminal 61. Thus, delay line 60 delays the most significant digit a period of time equal to T, while the delay line 59 delays the second most significant digit an interval equal to 2T, and so forth. In this manner the individual pulses of the code group occur in a time sequence beginning with the most significant digit pulse and proceeding to the least significant digit pulse.

It can be seen that the decoding process for generating reference signals for the individual digit comparisons is done in entirely passive networks composed only of resistors. The accuracy of these resistors and hence of the decoder output may be fixed as closely as is desired. As will be seen later, the switches 49 through 54 are constructed so as to have little or no effect on the speed or accuracy of the decoding process.

It should be further noted that the delay interval introduced by delay lines 57 through 60 must be of sufficiently short duration to enable the least significant digit to pass therethrough during the interval separating the generation of each digit of the code, and hence the period of clock source 46.

Figure 3:
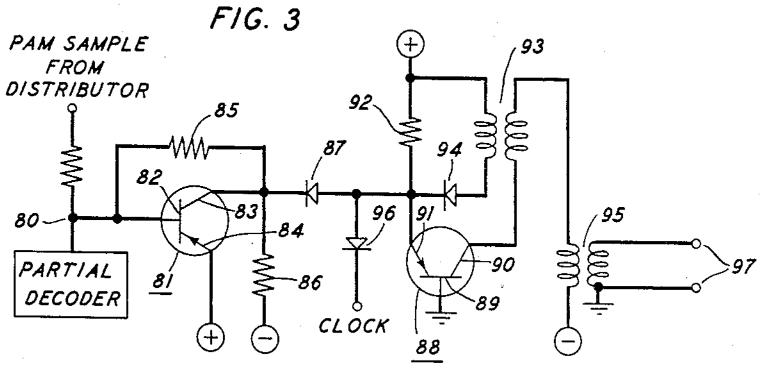
Fig. 3 is a schematic diagram of a comparison circuit which can be used in the embodiment of Fig. 2.

In Fig. 3 there is shown a pulse generating circuit suitable for use in the sequential digit recognition encoder of Fig. 2. This circuit comprises a transistor 81 serving as a threshold amplifier, a pair of diodes 87 and 96 connected as an And gate and a transistor 88 connected as a blocking oscillator. Amplifier 81 conducts only if the PAM sample from distributor 11 is equal to or greater than the reference current produced by the partial decoder (or by source 74 and resistor R1 in the case of pulse generating circuit $A_1$).

The threshold amplifier itself comprises the transistor 81 having a base 82, collector 83 and emitter 84 and connected in common emitter configuration. A feedback resistor 85 serves to provide a stabilizing bias for transistor 81 while a negative voltage source provides the necessary collector voltage through a resistor 86. Emitter 84 of transistor 81 is tied to a positive voltage.

The output of the threshold amplifier, when conducting, enables one input of the And gate by back-biasing normally conducting diode 87. The other half of the And gate, diode 96, is enabled by being cut off by a negative clock pulse. When fully enabled by the simultaneous presence of an output from transistor 81 and a negative clock pulse, the normally quiescent blocking oscillator comprising transistor 88 is triggered into conduction.

Blocking oscillator action is provided by coupling the collector 90 of transistor 88 to the emitter 91 by means of transformer 93. The pulse fed back appears across resistor 92 and is regenerative, driving transistor 88 into saturation. A diode 94 is provided in the regenerative feedback path to limit oscillation to one-half cycle of a single polarity. The output pulse is delivered to terminals 97 by means of transformer 95.

The circuit of Fig. 3 therefore provides a convenient means of producing a pulse output when the PAM sample is equal to or exceeds the value of the reference currents generated by the individual partial decoding circuits. If a higher degree of accuracy is desired, the circuit of transistor 81 may be replaced by a multistage feedback amplifier.

Figure 4:
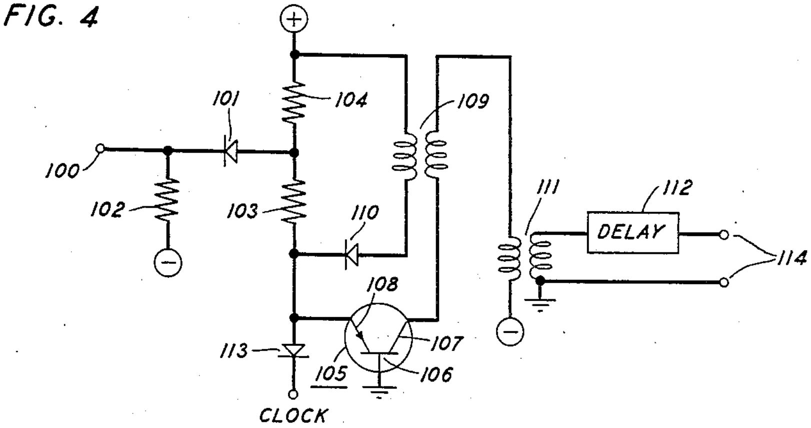
Fig. 4 is a schematic diagram of a delay circuit which can be used in the embodiment of Fig. 2.

In Fig. 4 there is shown a schematic diagram of a delay circuit and a pulse regenerator suitable for use in the encoder shown in Fig. 2. Essentially, this circuit comprises a blocking oscillator, transistor 105, operating in much the same manner as transistor 81 in Fig. 3, and a delay line 112. Pulses applied to input terminal 100 are used to initiate conduction in diode 101, biased by resistors 102 and 104, and thus trigger the blocking oscillator, provided a clock pulse is also present. This blocking oscillator comprises a transistor 105 having a base 106, collector 107 and emitter 108 and connected in the common base configuration. Resistor 103 is used to couple the trigger signal from diode 101 to transistor 105. A portion of the output of transistor 105 is coupled by means of transformer 109 and diode 110 across resistors 103 and 104 to give blocking oscillator operation. The pulse output of this oscillator is taken by means of transformer 111 and delivered to delay line 112. Delay line 112 delays this pulse output for the period between digit comparisons and delivers this delayed pulse to output terminals 114. Diode 113 provides a means of coupling the clock signal to the blocking oscillator input.

It should be noted that if delay line 112 of delay circuits 40 through 45 of Fig. 2 have sufficiently small losses, no regenerating blocking oscillator need be provided in the delay circuit. In this case the delay circuit would merely comprise a delay line such as line 112.

Figure 5:
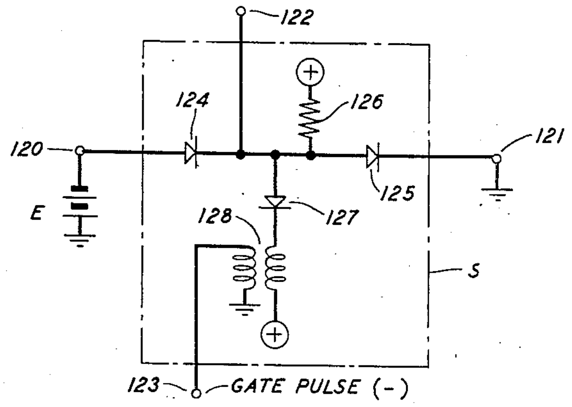
Fig. 5 is a schematic diagram of a diode switching circuit which can be used in the embodiment of Fig. 2.

In Fig. 5 there is shown a diode gating circuit suitable for use as switches "S" in the encoder shown in Fig. 2. This gating circuit comprises two diodes 124 and 125 connected in series between terminals 120 and 121. In the circuit of Fig. 2, terminal 120 would be connected to constant voltage bus 47 and terminal 121 would be connected to ground bus 48. A resistor 126 is used to apply a forward bias to diode 125 and thus, in effect, connect terminal 122 at the junction of the diodes to terminal 121 and ground.

A negative pulse delivered by one of the delay circuits to terminal 123 is coupled by means of transformer 128 and diode 127 to momentarily back-bias diode 125 and thus connect terminal 122 to the constant voltage source connected to terminal 120.

It can be seen that the circuit of Fig. 5 operates as a single-pole double-throw switch having its moveable contact normally connected to ground. Upon arrival of a properly polarized pulse at terminal 123, however, this contact is connected to a constant voltage source, connected to terminal 120. This switch is capable of extremely rapid operation and does not inhibit the speed of encoding taking place in the overall encoder of Fig. 2.

In all cases it is understood that the above-described arrangements are simply illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. Means for translating a train of amplitude modulated pulses into digital code groups comprising means for introducing each of said amplitude modulated pulses into a plurality of digit comparison circuits in a sequential fashion beginning with a most significant digit comparison circuit and proceeding to a least significant digit comparison circuit, each of said digit comparison circuits being adapted to produce a pulse output when said amplitude modulated pulse is equal to or exceeds a particular reference signal associated with that particular digit comparison circuit, and a partial decoding circuit associated with each of said digit comparison circuits, except said most significant digit comparison circuit, for producing said reference signals by decoding the pulse output of all of the more significant digit comparison circuits.

2. The translating means according to claim 1 wherein each said partial decoding circuits comprises a plurality of impedance elements connected in shunt and having values given by $$\left(\frac{1}{2^{n-1}}\right)Z_n=Z_1$$

where $Z_n$ is the value of the $n$th impedance element, $Z_1$ is the value of the first impedance element, and $n$ is the number of the impedance element.

3. A sequential digit recognition encoder for encoding amplitude modulated pulse samples into permutation code groups of bivalued pulses in accordance with an $n$ digit binary code comprising $n$ amplitude comparison circuits each for comparing said pulse samples with a reference signal and for generating a pulse output when said pulse samples are equal to or exceed said reference signal, a commutator for distributing each of said pulse samples to all of said $n$ amplitude comparison circuits in sequence beginning with a first one of said comparison circuits, and $n-1$ partial decoders for producing reference signals for $n-1$ of said amplitude comparison circuits from said pulse outputs.

4. The encoder according to claim 3 wherein each of said partial decoders comprises a plurality of two-terminal resistors, the first terminals of all of said resistors being connected together, the opposite terminals of all but one of said resistors being connected to switching means for connecting said opposite terminals to one of two reference potentials, and means for operating each of said switching means by said pulse outputs.

5. Means for encoding a signal wave in an $n$ digit binary code comprising means for obtaining amplitude samples of said signal wave, $n$ digit comparison means corresponding to said digits for comparing said amplitude samples with respective ones of $n$ digit reference signals, each of said comparison means being adapted to produce a binary pulse when said amplitude sample is equal to or exceeds the respective one of said digit reference signals, distributing means for applying each of said amplitude samples to all of said digit comparison means in consecutive order beginning with the most significant digit comparison means, and partial decoding means associated with each of said digit comparison means, except said most significant digit comparison means, for deriving said digit reference signals from previously produced binary pulses.

6. Encoding apparatus for representing instantaneous amplitudes of a signal wave by permutation pulse code groups of a fixed number of code elements in accordance with a digital code, said apparatus comprising means for recurrently sampling the instantaneous amplitude of said signal, a plurality of amplitude comparing means equal to said fixed number, a plurality of partial decoding means equal to one less than said fixed number, each of said partial decoding means being associated with a respective one of said comparing means, means for distributing each of said recurrent samples to all of said comparing means in a sequential manner, and means for connecting the output of each of said comparing means to successive ones of said partial decoding means.

7. A sequential digit recognition encoder for pulse code modulation systems comprising a signal sampler, a plurality of single digit encoding circuits and a distributor for delivering each sample from said sampler to all of said encoding circuits in a given sequence, each of said encoding circuits comprising an amplitude comparison circuit and a reference signal source, each of said reference signal sources except one including means for decoding at least one digit derived from one other of said amplitude comparison circuits.

8. A sequential digit recognition encoder for pulse code modulation systems comprising a source of amplitude modulated pulses, a partial encoding circuit for each digit of said pulse code and means for delivering each pulse from said source to all of said partial encoding circuits in sequence, a decoding circuit being included in each of said encoding circuits for decoding all previously encoded digits.

9. Means for translating a train of amplitude modulated pulses into digital code groups comprising a commutator, a plurality of digit comparison circuits connected to the outputs of said commutator, each of said digit comparison circuits being adapted to produce a pulse output when said amplitude modulated pulse equals or exceeds a particular reference signal, means for generating each of said reference signals, each said generating means but one comprising a plurality of resistances all connected at one end to one of said digit comparison circuits and each connected to respective ones of a plurality of normally grounded switching points at the other end, and means for connecting selected ones of said switching points to a fixed potential in response to the pulse output of the remainder of said digit comparison circuits.

10. The translating means according to claim 9 in which said digit comparison circuits comprise a threshold amplifier and a blocking oscillator.

11. The translating means according to claim 9 including delay circuit means between each of said digit comparison circuits and each said generating means.

12. Means for encoding a signal wave in an $n$ digit binary code comprising amplitude sampling means, $n$ digit comparison means corresponding to said digits for comparing amplitude samples derived from said sampling means with respective ones of $n$ digit reference signals, each of said comparison means being adapted to produce a binary pulse when said amplitude samples are equal to or exceed said digit reference signal, distributing means for applying said amplitude samples to said digit comparison means in consecutive order beginning with the most significant digit comparison means, and partial decoding means associated with each of said digit comparison means except said most significant digit comparison means, said partial decoding means comprising a plurality of resistive elements connected in parallel between said digit comparison means and a first point of fixed potential, and switching means responsive to said binary pulse output of all previous digit comparison means for connecting said resistive elements to a second point of fixed potential.

13. The encoding means according to claim 12 wherein pulse delay means are included between said digit comparison means and said switching means.

14. The encoding means according to claim 13 wherein pulse regenerating means are included between said digit comparison means and said switching means.

15. The encoding means according to claim 12 wherein said digit comparison means comprises blocking oscillator means.

References Cited in the file of this patent

UNITED STATES PATENTS

| | | |
|---|---|---|
| 2,729,790 | Haynes | Jan. 3, 1956 |
| 2,784,396 | Kaiser et al. | Mar. 5, 1957 |
| 2,787,418 | MacKnight et al. | Apr. 2, 1957 |
| 2,803,815 | Wulfsberg | Aug. 20, 1957 |